United States Patent [19]

Hannaford

[11] Patent Number: 5,536,517
[45] Date of Patent: Jul. 16, 1996

[54] MULTIDIE POSITIVE DISPLACEMENT METERING APPARATUS AND PROCESS

[76] Inventor: Christopher S. Hannaford, 2110 Toledo Ave. North, Golden Valley, Minn. 55422

[21] Appl. No.: 452,114

[22] Filed: May 26, 1995

[51] Int. Cl.⁶ .............................. A23L 1/00; A23P 1/00; B29C 47/00
[52] U.S. Cl. .................. 426/516; 425/131.1; 425/200; 425/382 R; 425/382.4; 425/463; 426/249; 426/448
[58] Field of Search .................................. 426/516, 517, 426/448, 249; 425/131.1, 198, 200, 382 R, 382.4, 463; 264/45.9, 176.1

[56] References Cited

U.S. PATENT DOCUMENTS

| | | |
|---|---|---|
| 2,680,880 | 6/1954 | Corbett ............................ 425/382.3 |
| 3,078,513 | 2/1963 | Levison et al. ................... 425/382.3 |
| 3,649,147 | 3/1972 | Fritsch ............................. 425/382.3 |
| 4,171,193 | 10/1979 | Rahlfs ............................. 425/382.3 |
| 4,336,213 | 6/1982 | Fox ................................. 425/382.3 |
| 4,900,572 | 2/1990 | Repholz et al. .................. 425/131.1 |
| 4,925,380 | 5/1990 | Meisner ........................... 425/131.1 |
| 4,925,689 | 5/1990 | Getman ........................... 425/131.1 |
| 5,019,404 | 5/1991 | Meisner ........................... 426/249 |
| 5,182,066 | 1/1993 | Marin .............................. 425/382.3 |

*Primary Examiner*—George Yeung
*Attorney, Agent, or Firm*—Nawrocki, Rooney & Sivertson

[57] ABSTRACT

This apparatus provides positive displacement synchronized metering of pressurized food material to a plurality of dies using several positive displacement metering apparatus. The metering is provided by the energy of pressurized material itself, or, for more viscous material, it can be supplemented by a motor. Supplemental material can also be introduced along with the food material to modify the characteristics of the food material.

22 Claims, 6 Drawing Sheets

MULTIDIE POSITIVE DISPLACEMENT METERING APPARATUS AND PROCESS

FIELD OF THE INVENTION

The present invention relates to metering viscous food material to a plurality of extrusion dies. More specifically, this invention teaches the use of positive displacement metering to a plurality of extrusion dies.

BACKGROUND OF THE INVENTION

A number of food extrusion processes require an equal flow of material from a number of dies which are fed from the same die holder. If the flow of material is unequal then the resulting product streams are also non-uniform which is undesirable. This is particularly true if the food material is cut to a predetermined length with an estimated weight for packaging based upon the length, which is not unusual in extruded food packaging.

A number of arrangements have been provided to attempt to provide equal amounts of food material from a number of dies with each die extruding the same quantity per unit time. Previous attempts have been directed to producing the same pressure on each die in an attempt to obtain the same quantity of extruded product per unit time.

Figure 1:
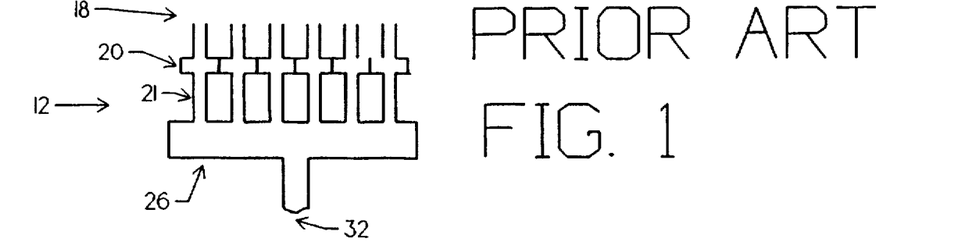
Figure 1A:
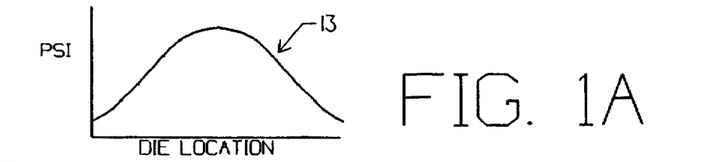

A example of the prior art, before an attempt was made to obtain equal pressure on each die, is shown in FIG. 1. Here extrusion apparatus 12 has a source of heated material introduced through pipe 32 into a manifold 26, which can be heated. Dies 18 are all connected to die holder 20, which has a conduit 21 opposite each die from die holder 20 into manifold 26. The result of this arrangement is shown in FIG. 1A with the resulting pressure in pounds per square inch (PSI) as a function of die location 13. FIG. 1A is also positioned opposite FIG. 1 such that the die locations of FIG. 1A all directly relate to the die 18 locations of FIG. 1. Since pipe 32 is centrally located the maximum pressure is also centrally located with a reduction in this pressure outwardly in both directions as shown in FIG. 1A.

Figures 2, 2A:
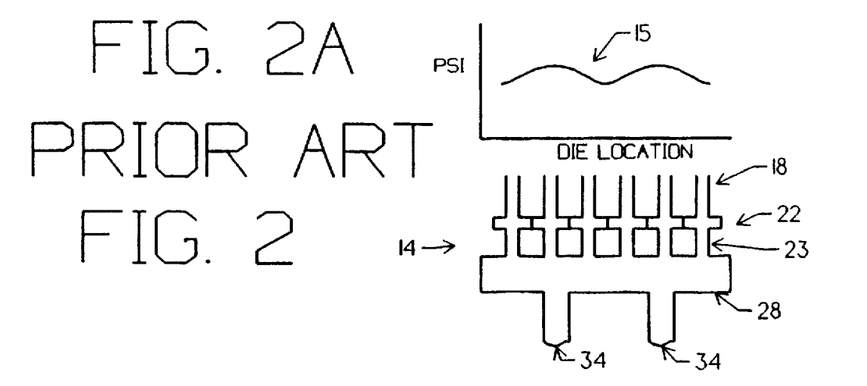

An attempt to remedy this situation is shown in FIG. 2 where extrusion apparatus 14 has two pipes 34 feeding heated pressurized food material into manifold 28. Conduits 23 extend between manifold 28 to die holder 22 opposite each die 18. The results of this arrangement is shown in FIG. 2A with the resulting pressure in pounds per square inch (PSI) plotted as a function of die location 15. FIG. 2A is also positioned opposite FIG. 2 such that die 18 locations of FIG. 2A correspond to the die locations of FIG. 2. Since pipes 34 are spaced approximately one-third of the distance along manifold 28, two maximums essentially opposite pipes 34 occur, with a reduction in these pressures outwardly in both directions as shown in FIG. 2A. This is an improvement over the results of extrusion apparatus 12 but the pressure of each die is still far from equal.

Figure 3:
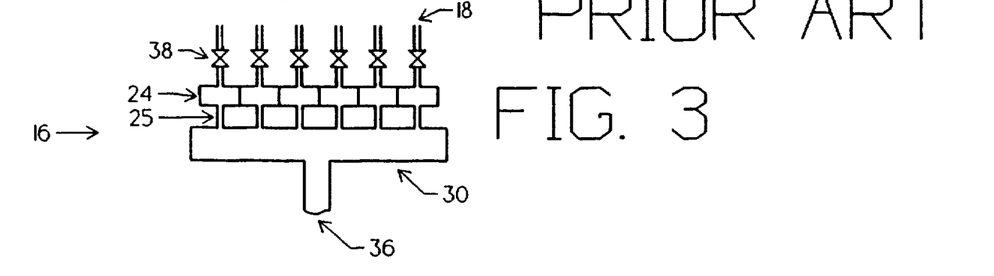
Figure 3A:
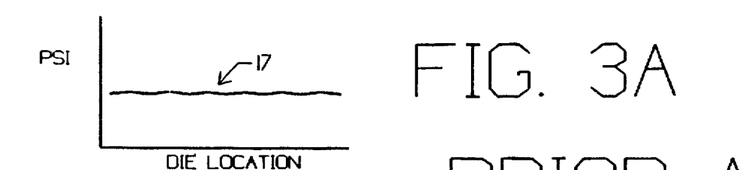

An improved attempt to provide equal pressure on dies 18 is shown in FIG. 3 with extrusion apparatus 16 again having only one pipe 36 feeding heated pressurized food material into manifold 30. Conduits 25 extend between manifold 30 to die holder 24 opposite each die 18. Here however each die 18 has a valve 38 in connection 23 to die holder 24. Valves 38 permit adjusting the pressure on each die 18 independently. The results of this arrangement is shown in FIG. 3A with the resulting pressure in pounds per square inch (PSI) plotted as a function of die location 17. FIG. 3A is also positioned opposite FIG. 3 such that die 18 locations of FIG. 3A correspond to the die locations of FIG. 3. Here the resulting pressure is nearly equal at all dies because valves 38 have been adjusted to achieve this result.

Even extrusion apparatus 16 does not produce the desired result of a uniform quantity of material extruded from each die 18 over any given time period. This results because the quantity being adjusted, namely pressure, is not the quantity which must be kept uniform, namely extruded material per unit time. Equal pressure on dies 18 will only produce equal flow if the material friction to and through each die remains identical, and if the material being extruded through each die has identical viscosities. Any difference in the temperature of a food material will result in a change in its viscosity, with lower temperatures resulting in greater viscosity. Dies 18 located at the ends of die holder 24 will receive material which has a longer flow path with a greater length of time to cool with a resulting greater viscosity, which will cause some of to adhere to the die intake reducing its size and increasing its friction. While a small differential is insignificant initially, the effects build up exponentially with time. Consequently, a small reduction in flow caused by lower temperature causing greater viscosity will result in the material being fed to that die flowing even slower, which increases the temperature differential even further. This builds up into a catastrophic failure quickly until the die is blocked completely. This is an inevitable result of any temperature differential in the material, and will always result in die blockage. Once even one die is blocked the die assembly must be disassembled and cleaned before it can be used further. These problems are multiplied when extruding multiple phases at one time, or when the material contains lumps of material of a size which can plug a die. Meisner, in U.S. Pat. Nos. 4,925,380 and 5,019,404 utilizes a scheme for manufacturing a multicolored aerated confection product utilizing multi-orifice extrusion system for extruding multiple strands of a confection material. These apparatus have the problems discussed above since no provision is made for metering equal amounts of material through individual dies.

A number of apparatus utilize positive displacement metering of both plastic and food materials to extrusion apparatus obtain a uniform product. These include Fox, U.S. Pat. No. 4,336,213; Rahlfs, U.S. Pat. No. 4,171,193; Fritsch, U.S. Pat. No. 3,649,147; R. Levison et al., U.S. Pat. No. 3,078,513; H. Corbett, U.S. Pat. No. 2,680,880; and Marin, U.S. Pat. No. 5,182,066

All of these positive displacement metering apparatus drive only a single extrusion die. There is no teaching of using a number of synchronized positive metering apparatus to provide a plurality of uniform and equal extrusions.

This invention positively meters food material through a plurality of dies. This assures that all flows remain open to all dies and rate predetermined by the capacity of the various metering means. This result is obtained regardless of the temperature of the material flow to any given die and completely overcomes the problems of all previous extrusion apparatus to multiple dies, where even a small temperature differential will always cause the catastrophic failure of total die blockages.

In the prior art using pressure balancing to obtain uniform flow through multiple dies, the flow rates are dependent upon the sum of all pressure losses along all flow paths including the flow path through each die. This invention frees the die designer from the constraint of balancing the pressure losses in each flow path to the individual dies. This can greatly simplify the die design itself, which results in a die easier to manufacture and clean. As an alternative, a more complex die can now be used to obtain previously unattainable results.

SUMMARY OF THE INVENTION

This invention provides several embodiments of apparatus for extruding streams of food material through a plurality of dies using several metering means to prevent blockage of any individual die caused by material temperature differentials, and procedures for doing the same. In one embodiment a manifold, which provides a source of heated pressurized food material, feeds a plurality of pairs of gears having intermeshed portions which meter the material. These intermeshed portions of the gear pairs are interposed between the manifold and each die the intermeshed portion of each gear pair having an input receiving material from the manifold and an output feeding a separate die. Typically the gear pairs will all have identical displacements, however some pairs of gears can have different displacements by such means as having a different width or tooth depth to produce a different displacement, if desired.

The gears are arranged such that a first half of the gears has a first shaft extending through them and a second half has a second shaft extending through them, with the first shaft having all the gears it extends through affixed to the shaft and the second shaft free-wheeling. This attachment of the first shaft forces all the gear pairs to rotate together in synchronism. This ensures that material will be metered by a gear pair through each die regardless of temperature differentials in the material creating differences in the material consistency. This results because the pressurized material introduced into the input duct acts upon all the intermeshed portions of all gear pairs and provides enough energy to them to cause them to rotate. All gears rotate in synchronism because of the first shaft attachment, and any local additional stiffness of material adjacent to any gear pair will not stop the rotation of the shaft. Since the rotation of the shaft rotates all gear pairs and the gear pairs provide positive displacement metering, material will continue to be fed to all dies regardless of localized viscosity changes.

The gear pairs provide a metering function only, the pressure of the material leaving each gear pair being less than the pressure of the material entering each gear pair. The pressurized material need only provide enough energy for metering and need not provide enough energy for pumping. Further, the spacing between the gears in the gear pairs must be quite large for metering which is incompatible with pumping. Any food material with a cP of 100,000 or less can be metered by the energy from the pressurized food material alone. This includes marshmallow food which has a cP of around 100,000. A cp of around 100,000 results in a pressure drop of approximately 100 psi across a gear pair.

If all the gear pairs have identical displacements the material stream into each die will be equal because of the shaft interconnection. If the gear pairs are unequal in displacement the material streams will also be unequal, but will have a volumetric ratio directly proportional to the gear pair displacements.

Some food material is too viscous for the food pressure to provide adequate energy to operate the gear pairs in the manner described, since food material can have a cP of up to 20,000,000. As an example, using this arrangement material with a 1,000,000 cP would result in a pressure drop of greater than 150 psi. This is an unacceptably large pressure drop and would result in product shear damage. In addition, the large tolerances between the gears required for metering would permit food material to leak around the gears rather than turn them. These problems are overcome in a variation to this embodiment by having the shaft driven by a motor to provide additional energy. This driven arrangement has a maximum operating cP range of up to 20,000,000. Here again the pressurized material energy and motor energy need only be adequate for metering and not for pumping.

The motor driving the common shaft can be provided with a controller. This controller can cause the motor to drive the shaft at a uniform rotation rate, resulting in uniform extrusions from each die with the ratio between them being determined by the gear pair displacements as before, or the controller can have selectable means to cause the shaft to rotate at varying predetermined rotation rates for special effects. This can including stopping the shaft for a predetermined period of time or even pulsing the shaft intermittently. Appropriate apparatus to obtain varying rotation rates can be accomplished by a number of mechanical or electrical apparatus and can readily be selected by those skilled in the art.

Each gear pair meters the material and as a side effect also mixes it very well. This results because the gears meshing shears material caught in the teeth to provide an effective mixing action. This mixing action can be used to advantage by introducing an extrudable or even a pumpable supplemental material, under pressure which is substantially the same as that of the pressurized food material, into a gear pair input where the gear pair will mix it with the food material. This extrudable supplemental material can include such things as a liquid, a viscous solid, or a combination thereof. These examples are given as illustrations and not as a limitation, any material which can be pumped or extruded can be used as a supplemental material.

This supplemental material can itself be or can contain a coloring agent, a flavoring agent, or any other agent or combination thereof which will modify a characteristic of the food material. Injected supplemental material which is a liquid will be mixed well with the food material by the action of the gear pair itself with no additional equipment being required. For extrudable material, static mixers, which are well known in the art, can be placed in the material stream between the meter and the die. This permits doing such things as extruding streams of food from different dies having different colors or flavors while using only one food material.

The supplemental material can itself be displacement metered. When gears are used for metering, the gears of the supplemental material gear pair can be attached to the same shafts as the other gear pairs with its output flowing into the input of the gear pair metering the food material. Since this is supplemental material a smaller volumetric flow is required than that of the food material, but since the volumetric displacements of the two gear pairs can be made different, as described earlier, this is a feasible requirement.

Other embodiments to the invention use different positive displacement metering of lobe impellers with either two or three lobes opposed to each other on two shafts as in the gear pairs. Four or more lobes could also be used for the impellers. Here too the energy for metering can be provided by the energy of the pressurized material or the energy can be supplemented by a motor. When lobe impellers are used the arrangement is almost identical to the gear pump arrangement where a plurality of lobe pumps feed a plurality of dies. Here however, the two shafts must both be attached to the opposed lobe pairs and the shafts must be synchronized by a gear pair since opposed lobe impellers are not self synchronizing.

Another embodiment uses a plurality of vane impellers on a single shaft for metering food material to a plurality of dies. Here too the energy can be provided by the pressure of the material or the energy can also be supplemented by a motor.

These apparatus and methods of using the same provides simple and effective means to completely overcome the previous problem of food material temperature differentials resulting in the catastrophic failure of a build-up of material completely blocking a die, because of the positive displacement action of the metering means. All of the metering means embodiments are arranged to be mounted in a split housing which is simply unbolted to remove and clean the metering apparatus. The simplicity of this apparatus is important because all equipment used for foodstuffs must be kept scrupulously clean. Cleaning complex machinery to the level required for foodstuffs is extremely difficult. The previous catastrophic build-up of food materials completely blocking the dies also required disassembly and cleaning every time a die was blocked with sanitation problems resulting from this repeated disassembly.

In addition to the various positive displacement metering means provided, this apparatus and method provides the capability of extruding streams of material having different colors and/or flavors from a single food material.

DESCRIPTION OF THE DRAWINGS

FIGS. 1, 2, and 3 show pertinent prior art at successive stages of development.

FIGS. 1A, 2, and 3A show the resulting pressure curves versus die position for successive stages of prior art development.

DETAILED DESCRIPTIONS OF THE PREFERRED EMBODIMENTS

Figure 4:
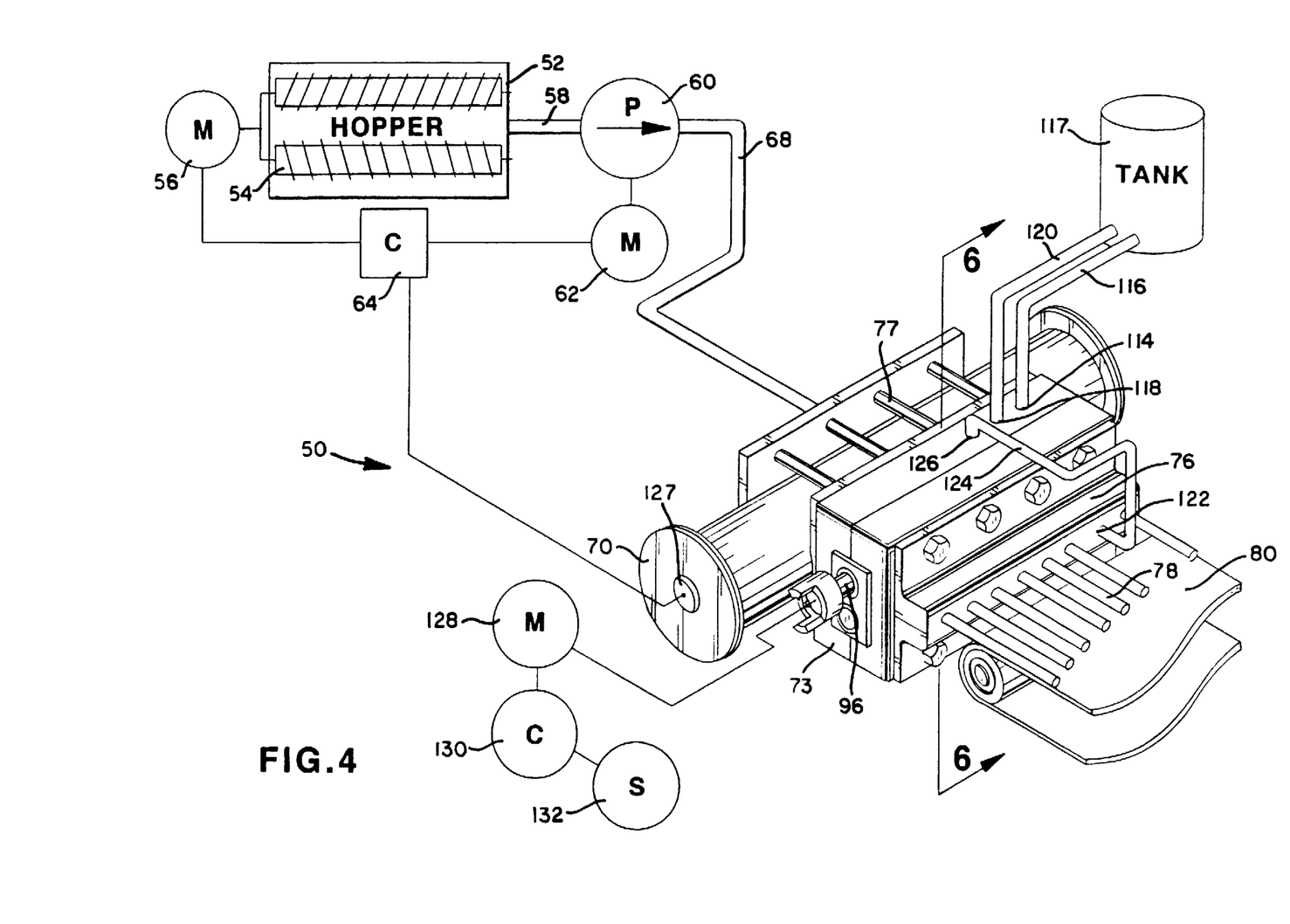
FIG. 4 shows an isometric view of the mechanical elements of the instant invention with the supporting apparatus being shown schematically.

An overview of multidie extrusion apparatus 50 is shown in FIG. 4. A hopper 52 with counter-rotating augers 54 mounted along the bottom which are driven by motor 56, force food material placed in the hopper rightward through pipe 58 and into pump 60. Pump 60 is driven by motor 62. Pump 60 pressurizes the material and forces it into heater 66 through pipe 68. A pressure sensor 127, mounted on the end of manifold 70, senses the internal pressure for feedback to motor 62 to obtain constant pressure on the material pumped into pipe 68. A heater and thermostat, not shown, heats the material within manifold 70 to a predetermined thermostatically controlled temperature.

The heated pressurized material flows from heater 66 into manifold 70 through pipe 68. Manifold 70 is adjacent to divided metering housing 73. Material 78 which was transported from manifold 70 through metering housing 73 thence to a number of dies 74, not shown in this figure, located within die housing 76, is extruded as streams of such material to conveyor 80, where they are carried away. This paths for the flow of material will be described later.

Figure 5:
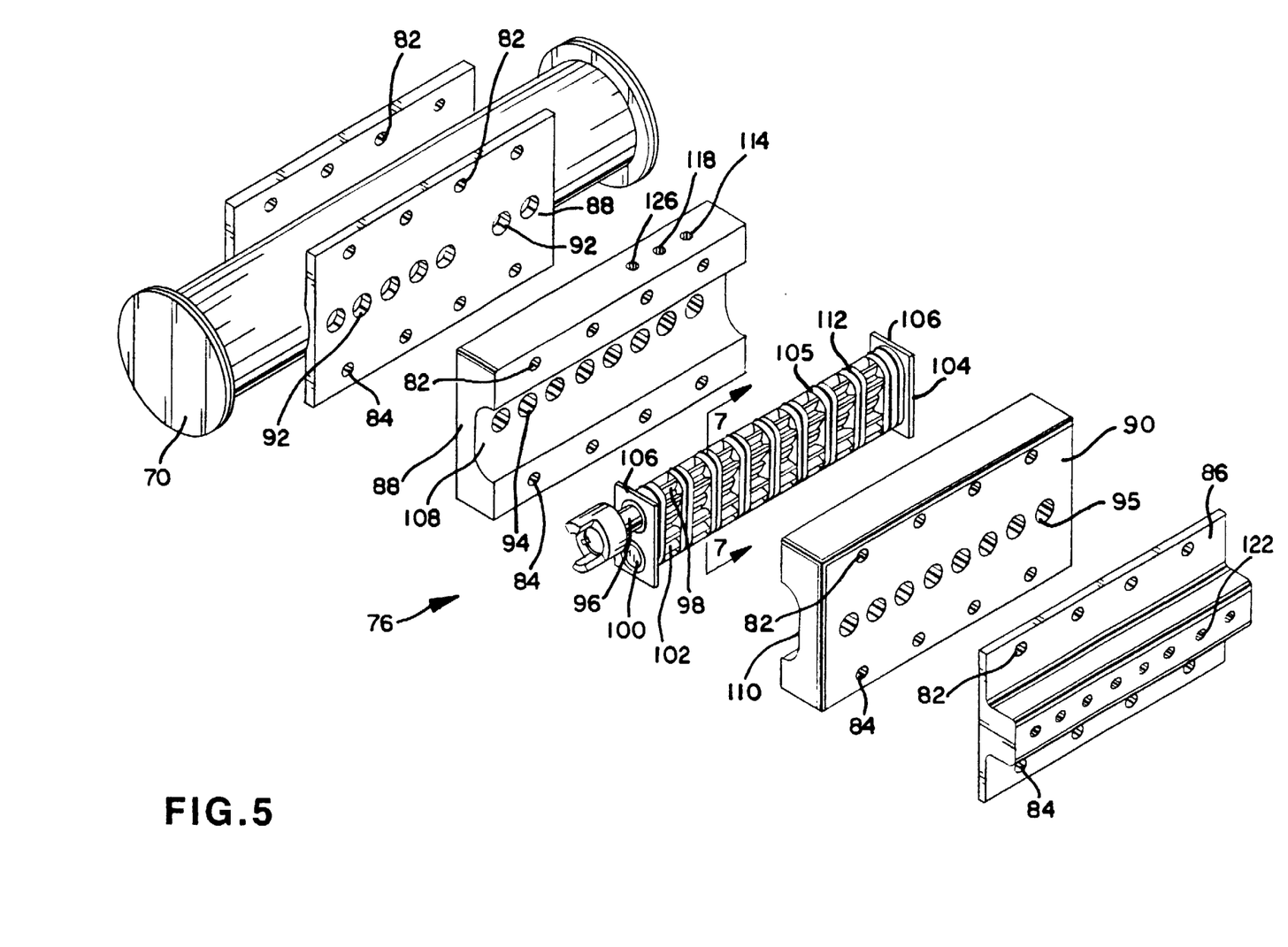
FIG. 5 shows an exploded view of the mechanical elements of the instant invention.

Manifold 70, divided metering housing 73, die housing 76 and die holder 86 are also shown in FIG. 5. Eight bolts 77 with attached nuts, not shown in this figure, extend through four upper holes 82 and four lower holes 84 in these parts hold them all together.

Metering housing 73 is made up of an input portion 88 and an output portion 90 which are essentially mirror images of each other. A set of seven holes 92 which are aligned with each other provide a path for food material from manifold 70 through input housing portion 88. One hole is omitted because supplemental material rather than food material is fed to the metering means through a different hole, as will be described later. A second set of eight input duct holes 94 in input housing portion 88, aligned with holes 92, provide a path for food material through input housing portion 90. A third set of eight output duct holes 95 aligned with holes 94 provide a path to die housing 76. Dies 122, as shown in FIG. 6A, receive and extrude streams of material 78, shown in FIG. 4, received from output duct holes 95.

A shaft 96 extends through and is affixed to eight upper gears 98 and a lower shaft 100 extends through and is free-wheeling to eight lower gears 102. Each of the eight upper gears 98 are intermeshed with an opposite lower gear 102. This intermeshing of an upper gear 98 with a lower gear 102 provides a positive displacement metering function. Input duct holes 94 in input portion 88 and output duct holes 95 in output portion 90 of metering housing 73 are aligned with opposed intermeshed portions of gears 98 and 102 which respectively receive and exhaust metered material.

Figure 7:
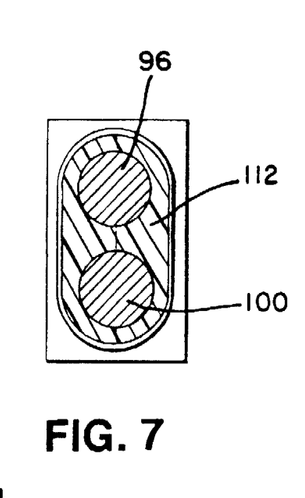
FIG. 7 shows a spacer between gear pairs.

Each end 106 of gear frame 104 rotatably holds shafts 96 and 100. Spacers 105 of gear frame 104, located between each opposed pair of gears 98 and 102 also shown in FIG. 7, are shaped to closely fit within the cavity formed by recess 108 in input portion 88 and recess 110 in output portion 90 of metering housing 73. Gaskets 112 mounted around each spacer 105 seal material within each gear pair. In addition, bearings and seals mounted within each seal on each spacer 105 around shafts 96 and 100, not shown, seal the shafts and permit the shafts to rotate.

Figures 6, 6A:
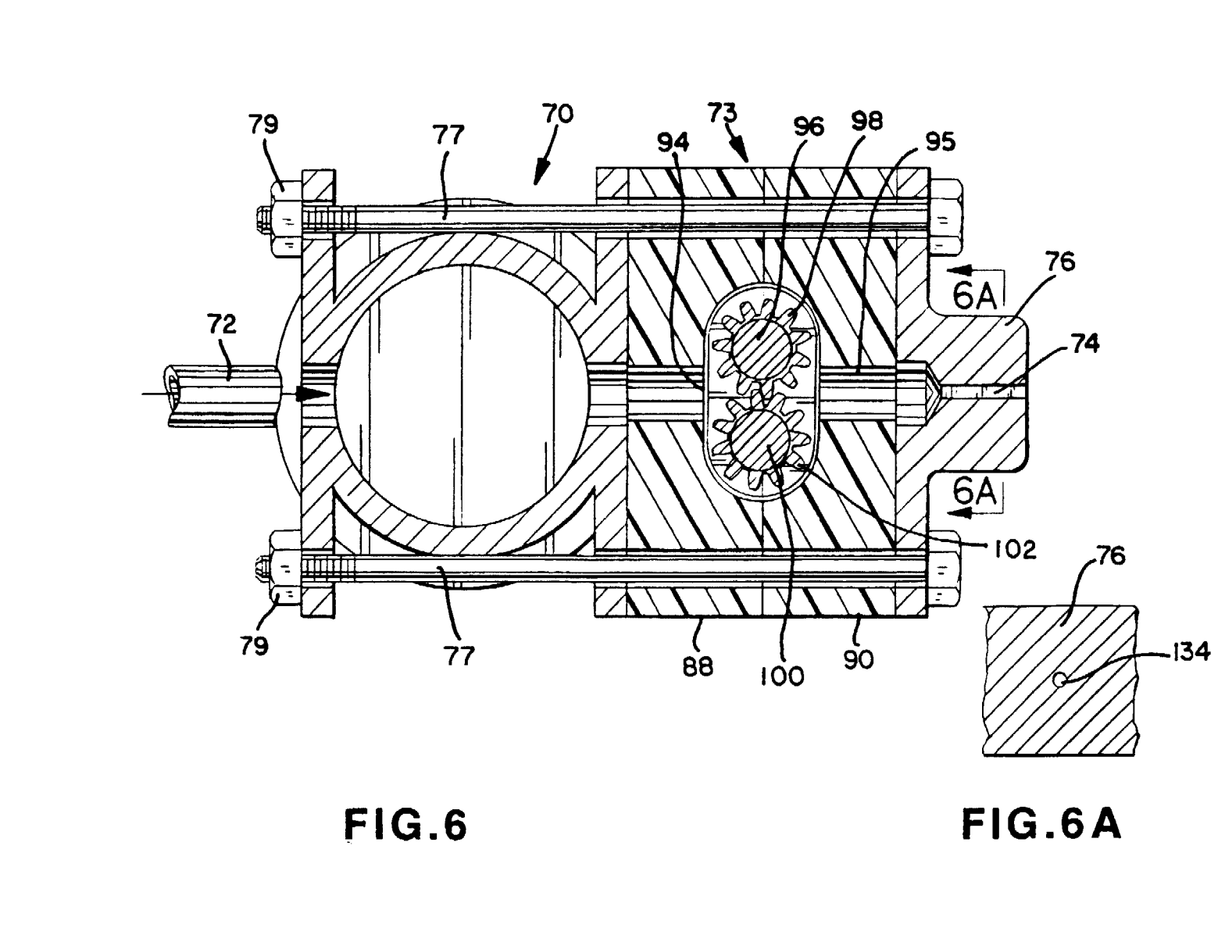
FIG. 6 shows a cross-section of FIG. 4 taken along 6—6.
FIG. 6A shows a cross-section of FIG. 6 taken along 6A—6A.

FIG. 6 shows metering housing 73, made up of input portion 88 and output portion 90, and die housing 76, all being held together by bolts 77 and attached nuts 79. An upper gear 98 is shown intermeshed with a lower gear 102, with input duct hole 94 opposite output duct hole 95 and both opposite the intermeshed portion of the gears. Die 74 communicates with output duct hole 95 to receive material from the metering gears. Upper shaft 96 through upper gear 98 and lower shaft 100 through lower gear 102 can be seen. FIG. 6A shows die opening 122 of one of the dies 76 which extrudes material. As also shown in FIG. 4, hole 114 extends through input housing portion 88 into the outermost input duct hole 92 with pipe 116 conveying pressurized supplemental material from pressurized tank 117 into the hole. Pipe 116 injects supplemental material into the gear pair adjacent to frame end 106 to be mixed with food material.

As shown in FIGS. 4 and 5, hole 118 through input housing portion into the input duct hole 94 second from end 106 has a pipe 120 conveying supplemental material into this hole from pressurized tank 117. This injects supplemental material only into the second pair of gear pairs to be metered, since the opposed manifold hole 92 is blocked. Hole 122 opposite output duct hole 95 provides this metered supplemental material to pipe 124 to be conveyed to hole 126 into the adjacent inner input duct hole 94, which is third from outer end 106, to be mixed with food material from opposite input duct hole 94.

Streams of material 78 are shown being extruded from dies 122 onto a moving conveyor belt 80 arranged to carry the extruded material away from all gear pairs, excepting only the second gear pair from the outer end as explained earlier.

Motor 128 is connected to and drives upper shaft 96 in a direction which will meter material from input duct holes 94 through metering gears 98 and 102 through output duct holes 95. Motor controller 130 will cause shaft 96 to rotate at a constant speed unless modified by selectable control apparatus 132 which will cause the shaft to rotate at one of a number of preselected variable rates which change with time. Motor controller 130 can be any one of a number of available motor controllers known in the art. In addition, control apparatus 132 providing a number of selectable variable changing rotation rates can be mechanical, electrical, computer generated or a combination thereof. Apparatus such as this is currently available in all these forms and one skilled in the art can readily select an appropriate control apparatus for this application.

Figure 8:
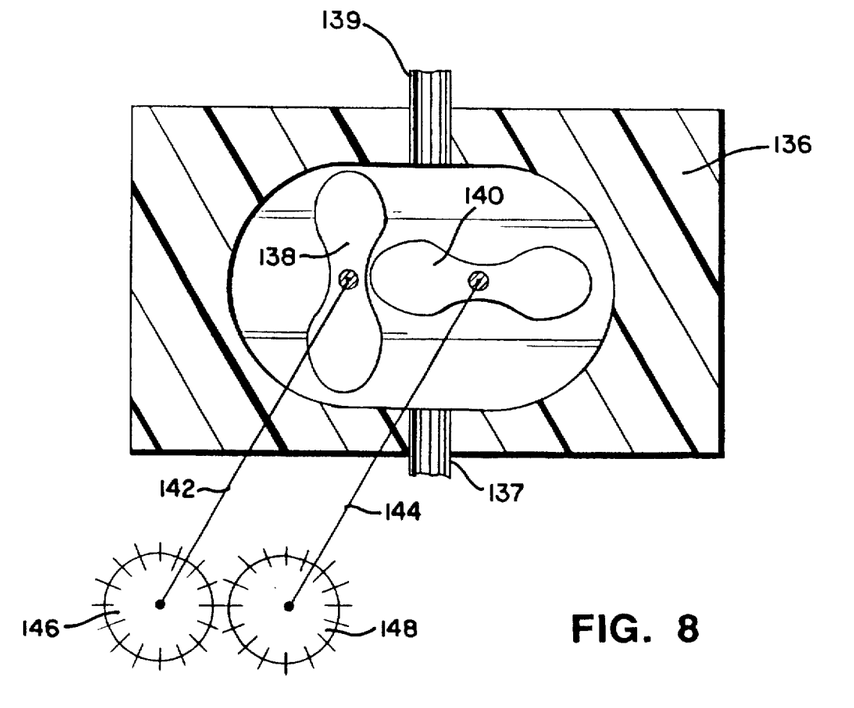
FIG. 8 shows a two lobe positive displacement metering with shafts and synchronizing gears shown schematically.

The positive displacement metering means described above is not the only positive displacement apparatus which can be used. FIG. 8 shows two lobe positive metering apparatus 136 comprised of opposed two lobe impellers 138 and 140 affixed to shafts 142 and 144 respectively, which interleave to provide positive displacement metering. Shaft 142 replaces shaft 99 and shaft 144 replaces shaft 100 in FIG. 4, with housing 73 modified appropriately to contain eight two lobe positive displacement metering apparatus 136 in the same manner as the opposed upper gears 98 and lower gears 102. Synchronizing gears 99 and 101 are mounted on the end of shafts 142 and 144 respectively with both shafts affixed to the respective two lobe impellers 138 and 140, because the two lobe impellers are not self-synchronizing.

Shaft 142 can be driven by the pressurized material itself acting against the interleaved two lobe impellers 138 and 140, or it can be driven by motor 128, which can also be controlled as before for constant or varying rotation rates.

Figure 9:
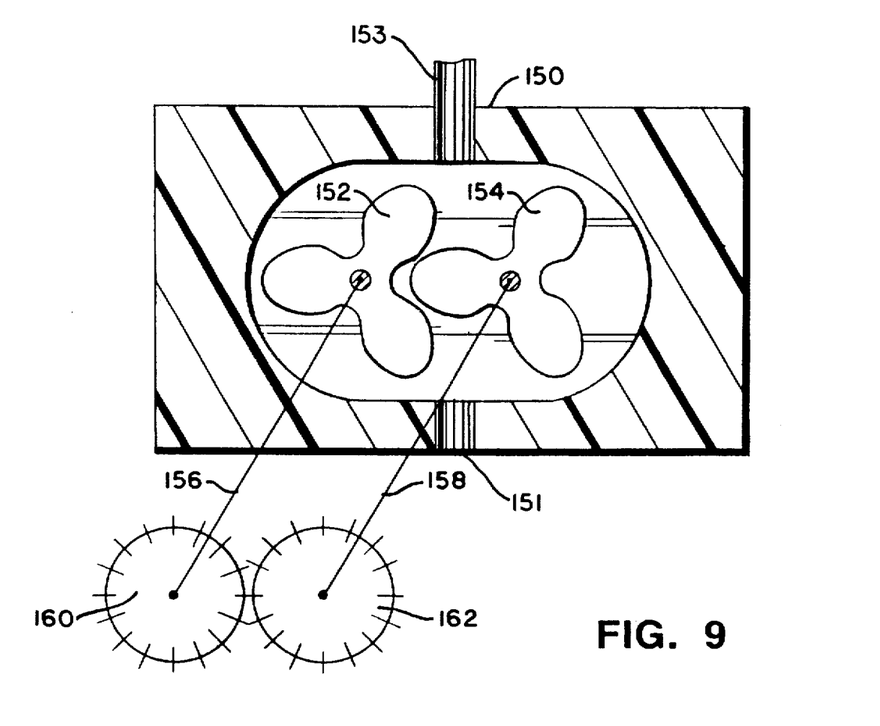
FIG. 9 shows a three lobe positive displacement metering with shafts and synchronizing gears shown schematically.

FIG. 9 shows three lobe positive displacement metering apparatus 150, comprised of three lobe impellers 152 and 154 affixed to shafts 156 and 158 respectively, which interleave to provide positive displacement metering. Shaft 156 replaces shaft 99 and shaft 158 replaces shaft 100 in FIG. 4, with housing 73 modified appropriately to contain eight three lobe positive displacement metering apparatus 150 in the same manner as the opposed upper gears 98 and lower gears 102. Here synchronizing gears 160 and 162 are again mounted on the end of shafts 156 and 158 respectively with both shafts affixed to the respective three lobe impellers 152 and 154, because the three lobe impellers are also not self synchronizing. Shaft 156 can be driven by the pressurized material acting against three lobe impellers 152 and 154 or it can be driven by motor 128, which can also be controlled as before for constant or varying rotation rates.

Figure 10:
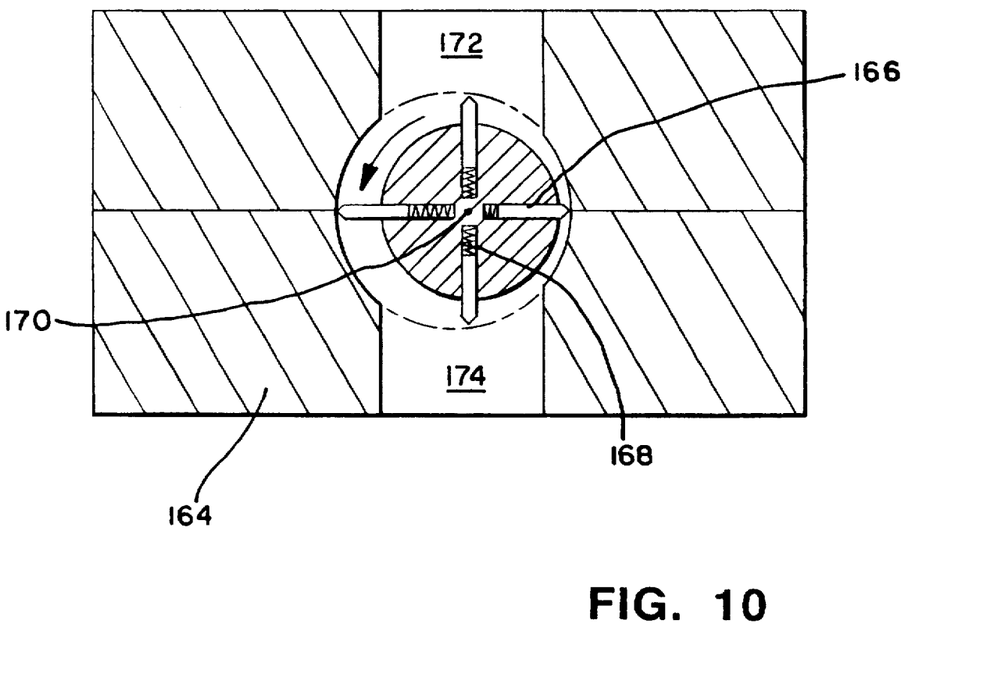
FIG. 10 shows vane displacement metering.

Another positive displacement metering means is shown in FIG. 10 where positive displacement vane metering apparatus 166, mounted on shaft 170, has vane impeller 166 having individual vanes which slidably mate with receptacles and are urged outwardly therefrom by springs 168. Inlet 172 and outlet 174 correspond to input duct holes 94 and output duct holes 95 of metering housing 73, as shown in FIG. 5. Shaft 170 corresponds to upper shaft 96 of FIG. 6, however here only one shaft is used for the vane impellers. Housing 73 is modified appropriately to contain eight positive displacement vane metering apparatus 166 in the same manner as the opposed upper gears 98 and lower gears 102. Here synchronizing is not required because of only one shaft being used.

Shaft 170 can be driven by the pressure of the material against the vane impellers 166, or it can be driven by motor 128, which can also be controlled as before for constant or varying rotation rates.

This simple mechanical apparatus, which is easy to disassembly and clean, will extrude multiple streams of material with predetermined flow rates, depending upon the capacity of the gear pumps, with no possibility of unequal temperatures within the material mix causing any blockage of dies. In addition to continuous flow rates, non-uniform flow rates can be selected. Having the metering means arranged for easy cleaning is imperative in machinery for foodstuffs. Further, supplemental material can either be injected or metered into the food material at the input to the metering gears to provide extruded streams having different characteristics, such as color or flavor, using only a single food material.

While this invention has been described with respect to a specific embodiment, this description is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as fall within the true scope of the invention.

I claim:

1. Apparatus for extruding pressurized material comprising:
   a) a plurality of first positive displacement metering means for metering extrudable pressurized material, said metering means having an input duct for receiving material and an output duct for discharging material, said metering means also having interconnecting means for synchronizing said plurality of first metering means, said first metering means operating energy being obtained from said pressurized material;
   b) delivery means for delivering extrudable pressurized material to each said first metering means input duct;
   c) a plurality of die means for receiving material from each said first metering means output duct and extruding said material.

2. Apparatus as in claim 1 wherein said first metering means further comprises supplemental energy means for supplementing the energy provided by said pressurized material.

3. Apparatus as in claim 2 with said supplemental energy means having control means for metering uniform quantities of material as a function of time.

4. Apparatus as in claim 3 with said control means having means for selecting one of a plurality of different predetermined non-uniform quantities of material for metering as a function of time.

5. Apparatus as in claim 1 having means for injecting pressurized extrudable supplemental material into at least one said input duct.

6. Apparatus as in claim 5 having second positive displacement metering means for metering said injected supplemental material.

7. Apparatus as in claim 6 wherein said interconnecting means also synchronizes said second metering means with said first metering means.

8. Apparatus as in claim 1 wherein:
   a) each said metering means comprises an intermeshed portion of a first gear and a second gear of a gear pair, said metering means further comprising a first shaft and a second shaft, said first shaft extending through all said first gears, and said second shaft extending through all said second gears; all said gear pairs having a supporting enclosure therearound arranged such that said gear pairs and shafts can rotate freely therewithin with all shafts and all gear pairs being sealed from the outside and from each other; said enclosure having said input ducts and said output ducts formed therethrough opposite each other in communication with the intermeshed portion of each said first gear and said second gear and directed outwardly therefrom; and
   b) said interconnecting means comprises all said first gears being attached to said first shaft.

9. Apparatus as in claim 8 having motor means for providing additional energy for driving said first shaft in a rotation direction such that material for each gear pair is metered from said input ducts to said output ducts.

10. Apparatus as in claim 9 with said motor means having speed control means for metering uniform quantities of material as a function of time.

11. Apparatus as in claim 10 with said control means having means for selecting one of a plurality of different predetermined non-uniform quantities of material for metering as a function of time.

12. Apparatus as in claim 1 wherein:
   a) each said metering means comprises opposed multi-lobed interleaved identical first and second impeller means for metering material, said metering means further comprising a first shaft and a second shaft, and a first synchronizing gear and a second synchronizing gear, said synchronizing gears being mated and engaging each other, said first shaft extending through and being affixed to all first impeller means and said first synchronizing gear, and said second shaft extending through and being affixed to all second impeller means and said second synchronizing gear, all said impeller means having a supporting enclosure therearound arranged such that said impeller means and shafts can rotate freely therewithin with all shafts and all impeller means pairs being sealed from the outside and from each other; said enclosure having said input ducts and said output ducts formed therethrough opposite each other in communication with said impeller means and directed outwardly therefrom.

13. Apparatus as in claim 12 wherein said first and second impeller means each comprise two lobes.

14. Apparatus as in claim 12 wherein said first and second impeller means each comprise three lobes.

15. Apparatus as in claim 1 wherein:
   a) each said metering means comprises a plurality of positive displacement vane metering means comprised of vane impellers for metering material, said metering means further comprising a shaft, said shaft extending through and being affixed to all vane impellers, all said vane impellers having a supporting enclosure therearound arranged such that said impellers and shaft can rotate freely therewithin with said shafts and said impellers being sealed from the outside and from each other; said enclosure having said input ducts and said output ducts formed therethrough opposite each other in communication with said impellers and directed outwardly therefrom.

16. A process for extruding multiple streams of food materials comprising:
   a) providing apparatus comprising:
      1) a plurality of first positive displacement metering means for metering extrudable pressurized material, said metering means having an input duct for receiving material and an output duct for discharging material, said metering means also having interconnecting means for synchronizing said plurality of first metering means, said first metering means operating energy being obtained from said pressurized material;
      2) delivery means for delivering extrudable pressurized material to each said metering means input duct;
      3) a plurality of die means for receiving material from each said metering means output duct and extruding said material;
   b) metering a pressurized extrudable food material from said delivery means to said die means using said first positive displacement metering means; and
   c) extruding said food material through said die means to form multiple streams of food materials.

17. A process as in claim 16 wherein said apparatus provided further comprises supplemental energy means for supplementing the energy provided by said pressurized material.

18. A process as in claim 17 wherein said apparatus provided further comprises said supplemental energy means having control means for metering uniform quantities of material as a function of time.

19. A process as in claim 18 wherein said apparatus provided further comprises said control means having means for selecting one of a plurality of different predetermined non-uniform quantities of material metered as a function of time, said process further comprising selecting one of said plurality of non-uniform metered quantities.

20. A process as in claim 19 wherein said apparatus provided further comprises means for injecting pressurized extrudable supplemental material into at least one said input duct.

21. A process as in claim 20 wherein said apparatus provided further comprises second positive displacement metering means for metering said injected supplemental material.

22. A process as in claim 21 wherein said apparatus provided interconnecting means further synchronizes said second metering means with said first metering means.

* * * * *